United States Patent [19]

Briffett et al.

[11] Patent Number: 5,537,557
[45] Date of Patent: Jul. 16, 1996

[54] INTERFACE BETWEEN UNSYNCHRONISED DEVICES

[75] Inventors: Neil Briffett; Andrew J. Elms, both of Surrey; Carl R. Hejdeman, Hampshire, all of England

[73] Assignee: Nokia Mobile Phones Ltd., Salo, Finland

[21] Appl. No.: 312,898

[22] Filed: Sep. 27, 1994

[30] Foreign Application Priority Data

Oct. 1, 1993 [GB] United Kingdom .................. 9320276

[51] Int. Cl.$^6$ .............................. G06F 13/00; H04L 7/00
[52] U.S. Cl. ............................................. 395/309; 375/371
[58] Field of Search ................................. 395/280, 306, 395/309, 285, 550; 375/371

[56] References Cited

U.S. PATENT DOCUMENTS

| | | | |
|---|---|---|---|
| 3,970,997 | 7/1976 | Daly et al. | 340/172.5 |
| 4,935,942 | 6/1990 | Hwang et al. | 375/106 |
| 5,274,628 | 12/1993 | Thaller et al. | 370/47 |
| 5,331,669 | 7/1994 | Wang et al. | 375/371 |

FOREIGN PATENT DOCUMENTS

| | | |
|---|---|---|
| 0279564 | 8/1988 | European Pat. Off. . |
| 0534129 | 3/1993 | European Pat. Off. . |
| 2191906 | 12/1987 | United Kingdom . |

OTHER PUBLICATIONS

IBM Tech. Discl. Bulletin, vol. 36, No. 1, Jan. 1993, pp. 104–107, "Synchronous External Bus Architecture".

*Primary Examiner*—Jack B. Harvey
*Assistant Examiner*—Xuong M. Chung-Trans
*Attorney, Agent, or Firm*—Perman & Green

[57] ABSTRACT

An interface between unsynchronised devices such as ASICs. The interface comprises a delay means which synchronises the write strobe of the first device with the system clock of the second device, thus enabling the transfer of data from the first device to the second device. The interface requires fewer gates per register in the second device than prior art interfaces.

21 Claims, 4 Drawing Sheets

5,537,557

INTERFACE BETWEEN UNSYNCHRONISED DEVICES

BACKGROUND OF THE INVENTION

The present invention relates to an interface between unsynchronised devices.

The invention is particularly relevant to the interface between Application Specific Integrated Circuits (ASICs) and/or processors, which operate on unsynchronised system Clocks.

In order for a device such as a processor or second ASIC to change the register contents of a sending device such an ASIC comprising, for example a plurality of flip-flops, requires data to be presented to the second ASIC along with an address and a write strobe (WS). The second ASIC is, for the context of this document, considered to be clocked by a signal referred to as the ASICClock signal, to which the transferred data must ultimately become synchronised.

The address, write strobe (WS) and data signals are all synchronous to the sending device.

An address decode circuit on the ASIC will decode the incoming address, to generate register selects for every register.

The write strobe (WS) is used to latch the incoming data into a preliminary register, synchronous to the sending device, but physically existing on the ASIC (receiving device). The data in this register must then be transferred to a secondary register, clocked by the ASICClock signal.

A common problem with unsynchronised transfers is that when the data input to a flip-flop or latch changes at the same time as the clock or enable, the output can attain a condition referred to as metestability, which is an unpredictable, unstable state.

Therefore, when data is written into a register care must be taken to write the data when the ASICClock signal of the register is in an active state when data can be accurately and unambiguously written into the register. That is data should not be written into the register when the clock pulse is on its active transaction, i.e. either rising or falling depending on the device as this will lead to uncertainty as to whether or not the information will be stored correctly in the register. This is a problem particularly when data is being transferred between a first ASIC device and a second ASIC device which operate on different clocks.

According to the prior art, as illustrated in FIG. 1, the solution to the problem of metastability is to use three banks of flips flops 1,2,3, the first bank 1 being clocked by the sending device clock (the write strobe 4 in this instance), and the second and third banks 2 and 3 being clocked by the receiving clock (ASICClock). In this fashion although the data from the second bank 2 may be metestable, it will almost certainly be stable by the time the third bank 3 latches or clocks it in.

Regarding FIG. 1, data 16 from, and synchronous with the system clock of, the first ASIC 9 is supplied to the interface along with an address signal, and a write strobe (WS) signal. Data is presented to whichever register is selected by the address signal, after the address signal is decoded in the address decode logic 5.

A problem with this solution is the overhead in substrate real-estate (i.e., the excessive use of substrate surface area), because for every register in the ASIC there must be two extra registers of the same data width for the resynchronisation process. As well as the real-estate overhead, a significant power consumption overhead is incurred, due to the increased number of registers being clocked continually. This is a particular problem with devices in battery operated apparatus wherein the operating time of the apparatus before the battery is depleted is reduced by the excessive power drain.

SUMMARY OF THE INVENTION

According to the present invention there is provided, an interface between a first device and a second device which operate on independent clock signals, the first device producing a write strobe signal which triggers the transfer of data from the first device to the second device, the interface comprising a delay means which synchronises the write strobe signal from the first device with the clock signal of the second device, thus enabling the transfer of data from the first device to the second device.

An advantage of the present invention is the reduction in the number of gates required to interface between unsynchronised devices over prior art interfaces. Another advantage of the present invention is the solution of the problem of metastability between unsynchronised devices.

BRIEF DESCRIPTION OF THE DRAWINGS

An embodiment of the present invention will now be described, by way of example, with reference to the accompanying drawings, in which.

DETAILED DESCRIPTION OF THE INVENTION

Figure 1:
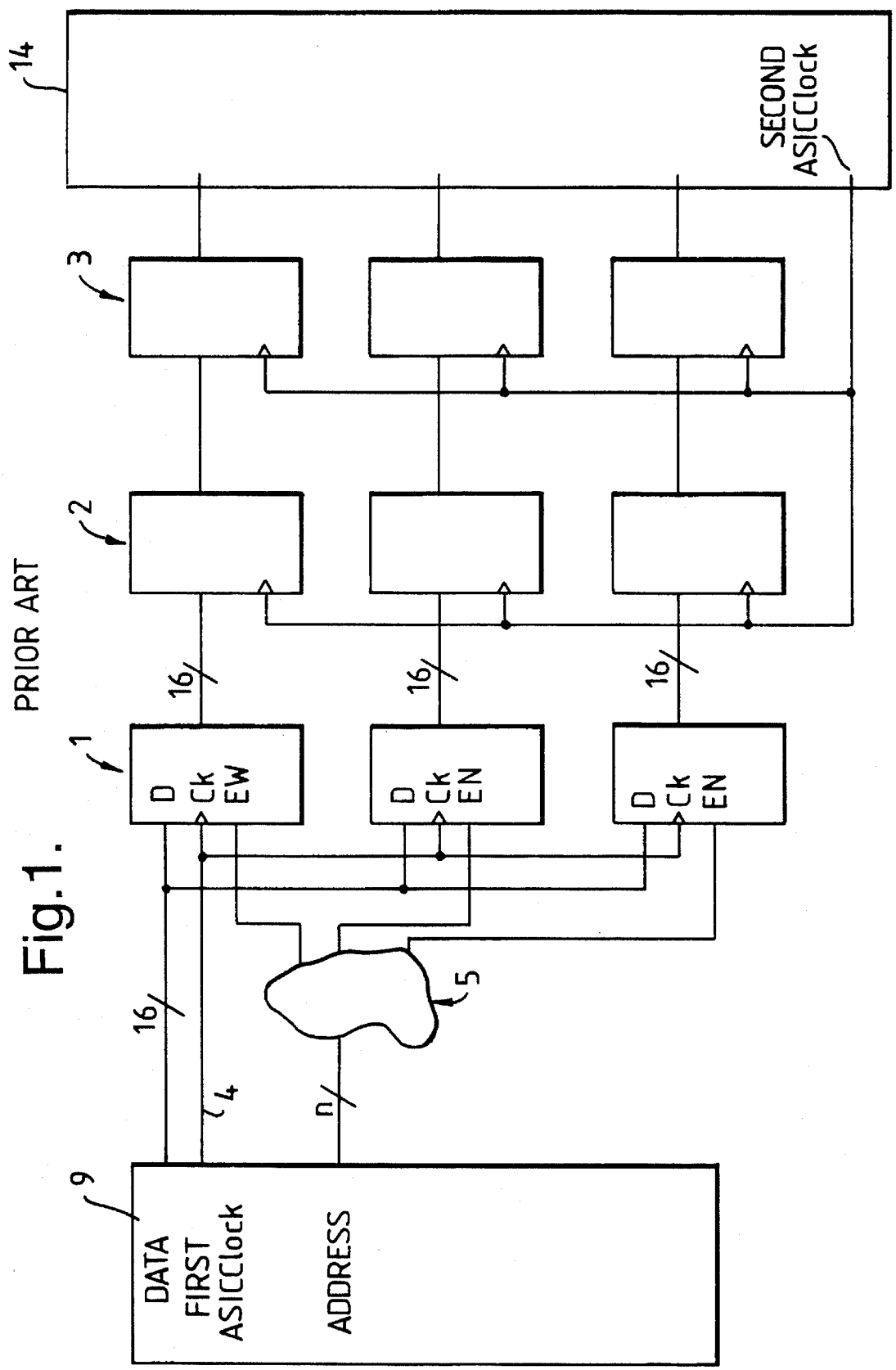
FIG. 1, is a schematic diagram of an interface between unsynchronised devices in accordance with the prior art.
Figure 2:
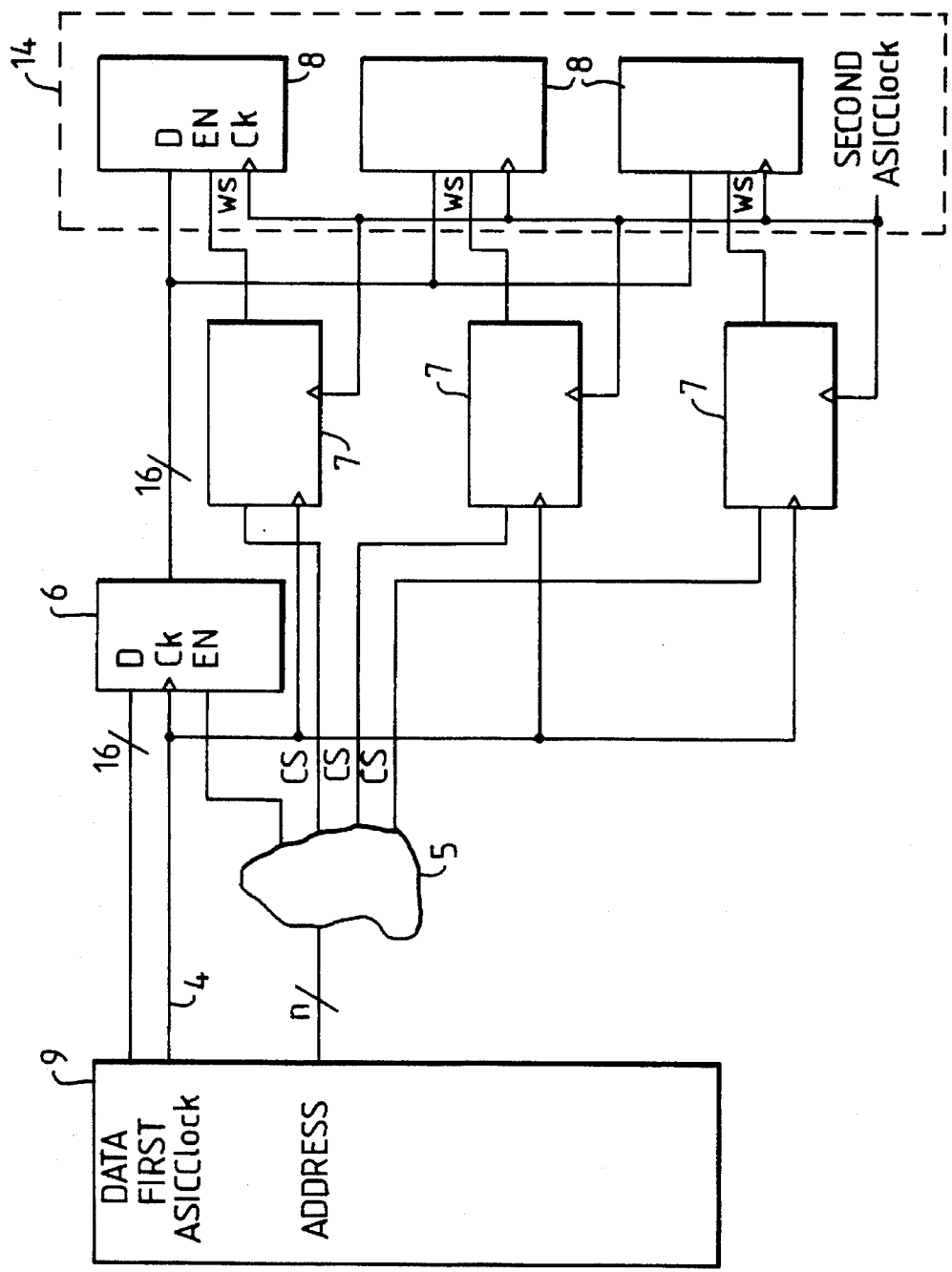
FIG. 2, is a schematic diagram of an interface between unsynchronised devices in accordance with the present invention.

Regarding FIG. 2, the interface in accordance with the present invention comprises a common first register 6. The register may comprise a plurality of flip-flops depending on the bit size of the data to be transferred from the first ASIC 9 to the second ASIC 14. In the interface shown in FIG. 2 there are 16 flip-flops in the common register 6.

The common register 6 is coupled directly to the second ASIC 14. The first ASIC 9 is coupled. to a plurality of parallel delay mechanisms 7 via the address decode 5. There is one delay mechanism 7 for each register 8 in the second ASIC 14. The appropriate delay mechanism is actuated in order to transfer the data from the common first register 6 to the desired register 8 in the second ASIC 14 under the control of the register signal (CS).

The common first register is synchronous with the ASIC-Clock signal 4 of the first ASIC 9. The output of the address decode 5, which is input to the first delay register (R1) of the delay mechanism 7 is therefore also synchronous with the Clock signal 4 from the first ASIC 14, see FIG. 3.

Figure 3:
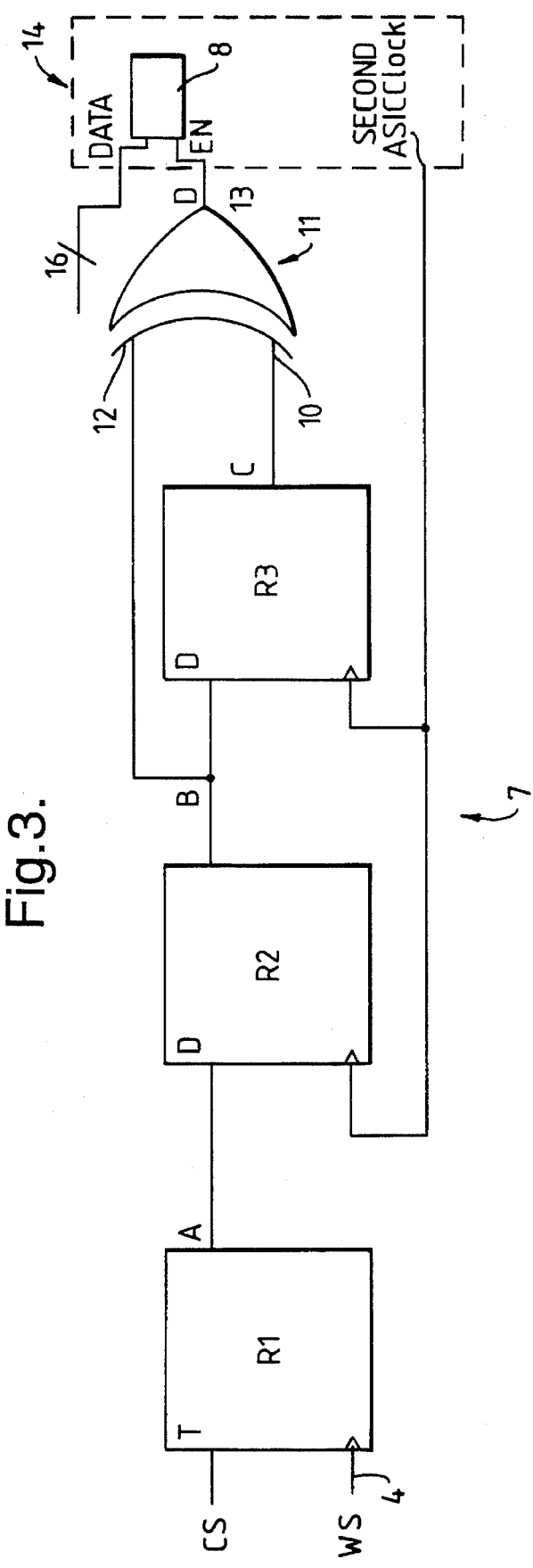
FIG. 3, is a schematic diagram of a delay mechanism of the interface of FIG. 2.

FIG. 3 illustrates the delay mechanism 7 in more detail. The address decode or register signal (CS) which is synchronous to the first ASIC 9 causes the first register (R1) to toggle i.e., change from logic state "1" to "0" or vice-versa, on the rising edge of the write strobe (WS). The output signal of the first register is latched into the second register (R2) on the next rising edge of the ASICClock signal of the second ASIC14. The output of the second register (R2) is provided both to a third register (R3), which is also synchronous to the ASICClock of the second ASIC 14, and to an input 12 of an exclusive-OR gate 11.

The output of the third register (R3) is provided to the other input 10 of the exclusive-OR gate 11.

The output 13 of the exclusive-OR gate 11 functions as an enable signal, enabling data to be transferred from the common register 6 to a specific target register 8 depending on the address signal (CS) provided.

Figure 4:
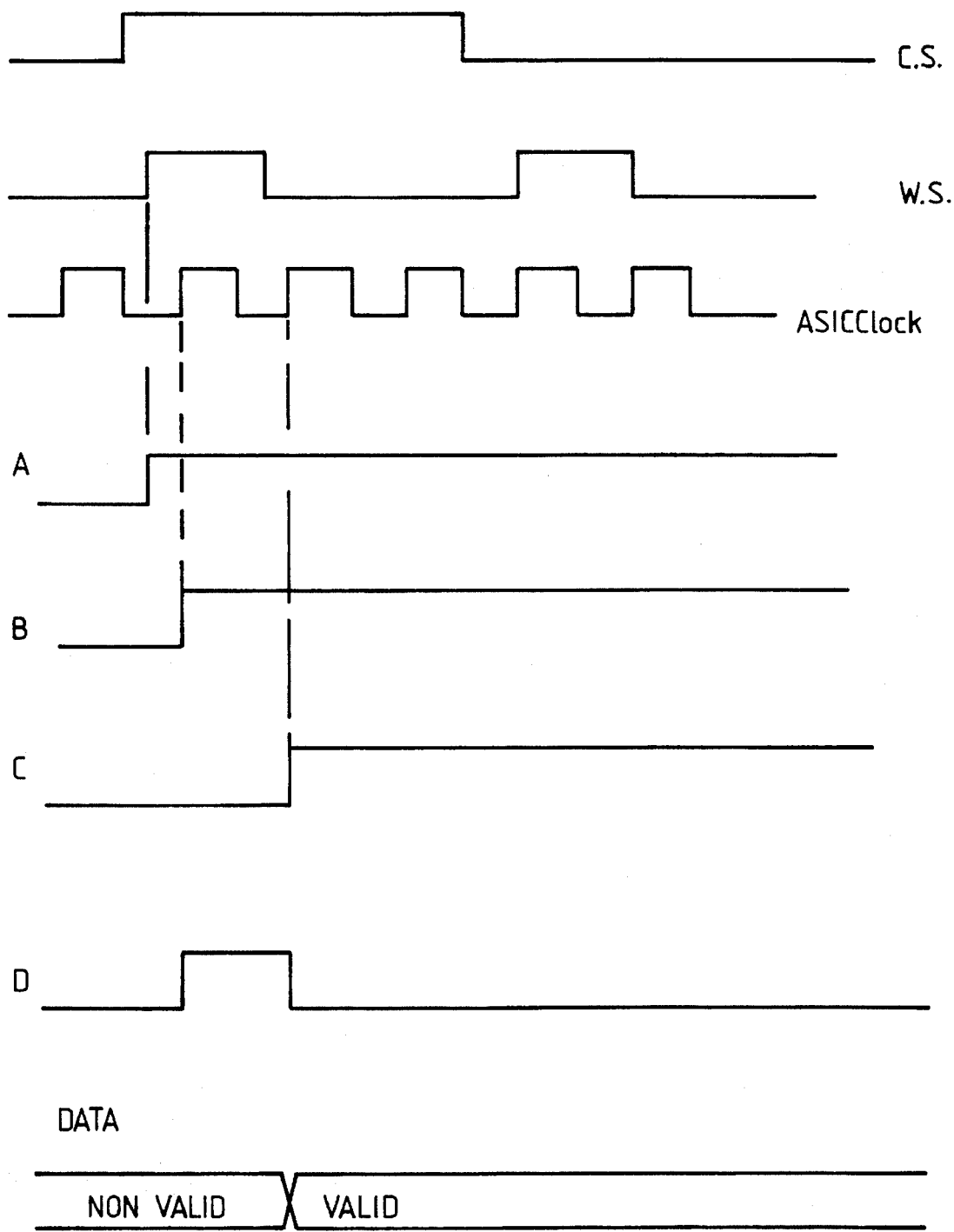
FIG. 4, is a timing diagram illustrating the synchronization of data from the first device, with the system clock of the second device, by the delay mechanism of FIG. 3.

FIG. 4 is a timing diagram illustrating the signals at specific parts throughout the interface. The top three signals are the register select (CS) signal decoded from the first ASIC 9 and the write strobe (WS) signal from the first ASIC 9 and the ASICClock signal from the second ASIC 14. The next four signals, A, B, C and D, illustrate the signal at four correspondingly marked positions throughout the interface, see FIG. 3. The last signal shows when the data is valid in the target register 8.

Once the write strobe (WS) is received by the first register (R1) in the delay mechanism 7 the output of the first register (R1) is changed from a logic "0" to a logic "1" (assuming an initial start condition of "0"), see signal A. This signal will remain a logic "1" until another write strobe (WS) is received by the register whilst the relevant register select is valid, whereupon the output will be toggled back to a logic "0". This output is synchronous to the system clock of the first ASIC. The output of the first register (R1) is provided to the second register (R2) as a substantially continuous logic "1". The status of the second register (R2) will be changed from logic "0" to "1" on receipt of a clock pulse from ASICClock (the system clock of the second ASIC), see signal B. Likewise the output of the second register (R2) will remain a logic "1" until the input signal changes. The output of the second register (R2) is transferred to the third register (R3), and to an input 12 of an exclusive-OR gate 11. The output of the third register (R3) will change from a logic "0" to a logic "1" on the rising edge of the next ASICClock pulse, see signal "C".

Again the output of the third register (R3) will remain a logic "1" until the input signal changes. The output of the third register (R3 is provided to the other input 10 of the exclusive-OR gate 11.

The output 13 of the exclusive-OR gate 11 will remain at logic "0", unless the inputs are different, see signal D.

Therefore, the write stroke (WS) input to the first register (R1), and synchronous to the first ASIC, has been transformed into an enable signal or write strobe (WS) for the second ASIC, which is synchronous to the ASICClock signal of the second ASIC. Thus data stored in the common data register 6 will be transferred to the appropriate register 8 in the second ASIC 14 in synchronisation with the ASICClock signal of the second ASIC 14. This results from the write strobe (WS), without which data is not transferred, having been synchronised with the ASICClock signal of the second ASIC.

This arrangement clearly uses many fewer gates than the prior art arrangements because the delay mechanism 7 requires only three single bit registers whereas the prior art system required a double bank of up to 16 bit registers, i.e., 32 bit registers, per register 8 in the second ASIC. As the ASIC could have up to 30 to 40 registers this is a considerable saving in chip space and power consumption.

It will be clear to a person skilled in the art that modifications may be incorporated without departing from the scope of the present invention. For example the asynchronous electronic devices with which the interface is used may not necessarily be ASICs. The invention may incorporate a first register for each delay mechanism as opposed to a common first register. Also if the first ASIC or other device is a slow device then the interface need not comprise a data storage register, either a common register or a separate register for each delay mechanism, as data will still be present at the target register of the second ASIC or other receiving device when the write strobe is provided to the target register via the appropriate delay mechanism.

What is claimed is:

1. An interface between a first and a second device, which devices operate on independent clock signals, the first device producing a selection signal, and a write strobe signal synchronous with the clock signal of said first device which triggers the transfer of data from the first device to the second device, the second device having a plurality of receiving registers for selectively receiving said data under the control of said selection signal, said interface comprising:

delay means, coupled between said first and second devices, for synchronising the write strobe signal from the first device with the clock signal of the second device and selectively controlling the transfer of data to said plurality of registers, said delay means comprising a plurality of enabling mechanisms coupled between said first device and a respective one of said plurality of receiving registers, each of said enabling mechanisms comprising:

a first 1-bit register means for outputting a first change of state signal in response to the receipt of said write strobe signal and said selection signal;

a second 1-bit register means, coupled to said first 1-bit register means, for outputting a second change of state signal in response to the receipt of said first change of state signal and the clock signal of said second device;

a third 1-bit register means, coupled to said second 1-bit register means, for outputting a third change of state signal in response to the receipt of said second change of state signal and the clock signal of said second device; and logic means, having inputs coupled to said second and third 1bit register means and an output coupled to one of said plurality of receiving registers in said second device, for producing an enable signal to enable said one receiving register to accept data transferred from said first device in response to said second and third change of state signals when said first 1-bit register receives said selection signal, whereby the transfer of data from the first device to the second device is synchronised with the clock signal of the second device.

2. An interface as in claim 1, further comprising a storage register means for storing the data to be transferred from the first device to the second device.

3. An interface as claimed in claim 1, wherein said logic means comprises an exclusive-OR gate.

4. An interface as in claim 1, further comprising address decode logic means for directing said selecting signal to the enabling mechanism coupled to the selected receiving register in said second device.

5. An interface as in claim 1, wherein at least one of said first and second devices is an ASIC.

6. An apparatus for transferring data between a first device and a second device, each being operable on a different clock signal, the first device producing a write strobe signal, synchronous with its clock signal, which triggers the transfer of data from the first device to the second device, comprising:

delay means, responsive to said write strobe signal and to said second device clock signal, for synchronising the write strobe signal with said second device clock signal so that the transfer of data from the first device to the second device is synchronised with said second device clock signal, said delay means comprising:

a first 1-bit register means for producing a first change of state signal in response to the receipt of said write strobe signal;

a second 1-bit register means, coupled to said first 1-bit register means, for producing a second change of state signal in response to the receipt of said first change of state signal and said second device clock signal;

a third 1-bit register means, coupled to said second 1-bit register means, for producing a third change of state signal in response to the receipt of said second change of state signal and said second device clock signal; and logic means, having inputs coupled to said second and third 1-bit register means and an output coupled to said second device, for producing an enable signal to enable said second device to accept data transferred from said first device in response to said second and third change of state signals.

7. Apparatus as in claim 6, wherein said second device comprises a plurality of receiving register means for selectively receiving said data, and further comprising:

a plurality of said delay means, respectively coupled to said plurality of receiving register means, for selectively providing an enable signal thereto;

means, coupled to said plurality of said delay means, for producing a selection signal for selecting one of said plurality of receiving register means to receive data; and wherein the first 1-bit register means of the delay means coupled to said selected one of said plurality of receiving register means, is responsive to said selection signal in combination with said write probe signal in producing said first change of state signal by which said enable signal is provided for selectively controlling the transfer of data to said selected one of said plurality of receiving register means.

8. Apparatus as in claim 7, wherein said selected one of said plurality of receiving register means is coupled to said first means by a delay means comprising a first, second, and third 1-bit register and a logic device connected in series.

9. Apparatus as in claim 8 wherein said logic device comprises an exclusive-OR gate.

10. Apparatus as in claim 7, wherein said means for producing a selection signal comprises address decode logic means for decoding an address signal received from said first means and synchronised with said first device clock signal.

11. Apparatus as claimed in claim 6, further comprising storage register means for storing the data to be transferred from said first device to said second device.

12. Apparatus as in claim 6, wherein at least one of said first and second devices is an ASIC.

13. Apparatus as in claim 6 wherein said logic device comprises an exclusive-OR gate.

14. A method for transferring data between a first device and a second device, each device being operable on a different clock signal, the first device producing a write strobe signal, synchronous with its clock signal, which triggers the transfer of data from the first device to the second device, comprising the steps of:

changing the state of a first 1-bit register in response to the receipt of said write strobe signal;

changing the state of a second 1-bit register in response to the changing of the state of said first 1-bit register and the receipt of a second device clock signal;

changing the state of a third 1-bit register in response to the changing of the state of said second 1-bit register and the receipt of a second device clock signal; and providing an enable signal from a logic device, responsive to the changes of state of said second and third 1-bit registers, for enabling said second device to accept data transferred from said first device.

15. A method as in claim 14, wherein said logic device comprises an exclusive-OR gate.

16. A method as in claim 14, wherein said first 1-bit register, second 1-bit register and third 1-bit register are connected in series with said logic device and each said register changes state each time a write strobe signal is transmitted by the first device.

17. A method as in claim 14, wherein said second device comprises a plurality of receiving registers, each said receiving register being coupled to said first device by a first, second, and third 1-bit register and a logic device connected in series, and comprising the further steps of:

producing a receiving register select signal for application from said first device to the first 1-bit register coupled to a selected receiving register from among said plurality of receiving registers; and adapting said plurality of first 1-bit registers respectively coupled to said plurality of receiving registers to change state only in response to the receipt of said write strobe signal and said receiving register select signal.

18. A method as in claim 17, wherein the step of producing a receiving register select signal comprises producing, from said first device and synchonised with said first device clock signal, an address signal indicative of the address in said second device of said selected receiving register, and decoding said address signal to direct a receiving register select signal for application to the first 1-bit register coupled to the selected receiving register.

19. A method as in claim 17, wherein said logic device of said second device comprises an exclusive-OR gate.

20. A method as in claim 14, further comprising the step of storing the data to be transferred from said first device to said second device in a storage register preparatory to the transfer.

21. A method as in claim 14, wherein at least one of said first and second devices is an ASIC.

* * * * *